United States Patent [19]

Jansen et al.

[11] Patent Number: 4,826,948
[45] Date of Patent: May 2, 1989

[54] IMPREGNATING AGENT AND ITS USE

[75] Inventors: Bernhard Jansen, Cologne; Hanns P. Muller, Odenthal; Roland Richter; Dietmar Schäpel, both of Cologne; Rudolf Schmidt, Burscheid, all of Fed. Rep. of Germany

[73] Assignee: Bayer Aktiengesellschaft, Leverkusen, Fed. Rep. of Germany

[21] Appl. No.: 196,920

[22] Filed: May 20, 1988

Related U.S. Application Data

[62] Division of Ser. No. 83,760, Aug. 10, 1987.

[30] Foreign Application Priority Data

Aug. 27, 1986 [DE] Fed. Rep. of Germany ....... 3629061

[51] Int. Cl.⁴ .............................................. C08G 18/00
[52] U.S. Cl. ..................................................... 528/28
[58] Field of Search .......................................... 528/28

[56] References Cited

U.S. PATENT DOCUMENTS 4,374,237 2/1983 Berger et al. .......................... 528/28

Primary Examiner—Maurice J. Welsh
Attorney, Agent, or Firm—Sprung Horn Kramer & Woods

[57] ABSTRACT

Impregnating agents are provided consisting essentially of
(a) an NCO-prepolymer or NCO-semi-prepolymer which is curable by atmospheric moisture, with an NCO content of 2 to 25% by weight, based on
  (a1) an organic polyisocyanate
  and
  (a2) a compound with at least 2 alcohol hydroxyl groups,
(b) a solvent which is inert with respect to isocyanate groups in which the (a1) organic polyisocyanate is a polyisocyanate with exclusively aliphatically or cycloaliphatically bound isocyanate groups and the a2) polyhydroxyl compound is a polysiloxane of the molecular weight range of 300 to 5000 which has at least 2 alcoholically bound hydroxyl groups.

A method of impregnating mineral substrates with such impregnating agents is also provided.

4 Claims, No Drawings

IMPREGNATING AGENT AND ITS USE

This is a division of application Ser. No. 083,760, filed Aug. 10, 1987.

The present invention relates to a new impregnating agent for mineral substrates based on NCO prepolymers or based on NCO semi-prepolymers which are reaction products of aliphatic and/or cycloaliphatic polyisocyanates with secondary quantities of polysiloxanes having alcohol hydroxyl groups. The invention also relates to the use of this impregnating agent for the impregnation of mineral substrates.

The use of polymer preparations for the impregnation of mineral substrates, for example, for the treatment of concrete, has already been known for a long time. In particular, the use of epoxy resins as coating material for the prevention of the admission of harmful, acid gases such as $CO_2$ and $SO_2$ and, in addition, $Cl^{\ominus}$ ions, and the use of epoxy resins for repairs to and the restoration of damaged concrete constructions is described by K. Sellars in a review article (Paint and Resin, October 1984, pages 33–37). The application of resin emulsions in special mortars for the restoration of concrete in EP-A-O No. 147 553 and EP-A-O No. 147 554 is also based on an epoxy resin base.

The distinctive feature of the techniques described here is the fact that the concrete which is to be treated is suitably protected by a coating which is situated outside on the concrete. This impervious layer has the disadvantage, however, that it is by no means possible for moisture to be exchanged between the concrete and the surroundings. This presents particular problems in rear-ventilated concrete structures (residential premises etc.) as the concrete cannot "breathe". A coating is, however, also disadvantageous because it will flake off it does not adhere adequately and/or can be vulnerable to being damaged.

An attempt is made to deal with these disadvantages in the coating processes by means of impregnation of the concrete. According to DE-OS No. 1 917 200 concrete parts are soaked with preparations based on silicone resin after a steam-treatment has taken place. DE-OS No. 2 053 110 describes concrete impregnation with the aid of silicone organic compounds after a hydromechanical cleaning of the surface to be treated. The impregnation carried out according to these processes is burdened by the preliminary treatment of the surfaces to be impregnated which can be both cost-intensive and also expensive to a greater or lesser degree depending on the construction.

DD-PS No. 206 984, DE-OS No. 2 505 286 and DE-OS No. 2 438 468 describe the use of organic solutions of ortho-silicic acid esters and particular alkoxy silyl compounds as impregnating agents.

According to U.S. Pat. No. 3,852,100, mixtures of toluylene diisocyanate, calcium cyanide, dimethyl formamide and methanol are used in aqueous suspension for the coating of concrete parts. DE-OS No. 3 135 941 finally describes the coating of concrete with polyisocyanate preparations, in particular, based on MDI, which are not described in greater detail.

The known processes for the treatment of concrete are unable, however, fully to satisfy the requirements in practice of an effective impregnating agent for the impregnation of mineral substrates, as either the impregnating effect is inadequate or the described agents are coating agents which prevent the substrate from "breathing" on account of the formation of a film on the surface of the substrates.

It was the fundamental object of the invention to make available an impregnating agent for mineral substrates, in particular, for concrete or natural stone, which combines, in particular, the following advantages:

1. The impregnation of substrates should have the effect of a considerable diffusion brake for carbon dioxide, in which process a steam diffusion which is as minimal as possible must be retained, and in which process the matt surface of the substrate should be maintained with respect to structure and colour.
2. The impregnation should be alkali-resistant, hydrophobic, temperature-stable within the range of $-40°$ to $+60°$ C., unable to be removed by washing and UV-resistant; the impregnating agent must penetrate into the substrate up to a depth of 3 to 5 mm; the capillary walls inside the substrate must be covered with a film which adheres well and the micro-pores must be closed.
3. The impregnating agent should be able to be mixed with water as far as possible, should have a high degree of capillary activity with, at the same time, low viscosity, should be largely harmless physiologically and should have a pot life in the open barrel of at least 30 minutes.

It has been possible to fulfil this object by the preparation of the impregnating agent according to the invention which is described in greater detail below:

The invention provides an impregnating agent consisting, essentially, of
(a) an NCO-prepolymer or an NCO-semi-prepolymer which is curable by atmospheric moisture with an NCO content of 2 to 25% by weight, based on
  (a1) an organic polyisocyanate and
  (a2) a compound with at least two alcohol hydroxyl groups,
(b) a solvent which is inert with respect to isocyanate groups
and, optionally,
(c) auxiliary agents and supplementary agents, in which the (a1) organic polyisocyanate is a polyisocyanate with exclusively aliphatically or cycloaliphatically bound isocyanate groups, and the (a2) polyhydroxyl compound is a polysiloxane of the molecular weight range of 300 to 5000 which have at least two alcoholically bound hydroxyl groups.

The invention also provides a method of impregnating mineral substrates, in which the above described impregnating agent is applied. Preferred mineral substrates for this method are concrete and natural stone.

The essential component (a) of the impregnating agents according to the invention is NCO prepolymers or NCO semi-prepolymers with an NCO content of 2 to 25, preferably 2.5 to 20, in particular, of 3 to 10% by weight NCO "prepolymers" are taken to be, for this purpose, extensively monomer-free reaction products of organic polyisocyanates with secondary quantities of organic polyhydroxyl compounds. The freedom from monomers is ensured either by the use of an NCO excess which is only minimal (NCO/OH equivalent ratio >1:1 and <2:1) or by the use of a high level of NCO excess (NCO/OH equivalent ratio >2:1) and the subsequent removal by distillation of the NCO excess which has not been reacted. "NCO semi-prepolymers" are taken to be mixtures of NCO prepolymers of that nature with monomeric starting polyisocyanates which have not been reacted.

Component (a) is produced by the reaction of (a1) organic polyisocyanates with exclusively aliphatically or cycloaliphatically bound isocyanate groups with (a2) secondary quantities of polysiloxanes with at least 2 alcoholically bound hydroxyl groups.

Suitable (a1) starting polyisocyanates are both low-molecular weight polyisocyanates with a molecular weight of less than 400 and also modification products of low-molecular weight polyisocyanates of that nature. Suitable low-molecular weight polyisocyanates are, for example, polyisocyanates of the formula $$Q(NCO)_n$$

in which n=2 to 4, preferably, however, 2
and

Q signifies an aliphatic hydrocarbon residue with 2 to 18 preferably 6 to 10 C atoms or a cycloaliphatic hydrocarbon residue with 4 to 15, preferably 5 to 10 C atoms.

Suitable low-molecular weight polyisocyanates of this nature are, for example, hexamethylene diisocyanate, 1,12-dodecane diisocyanate, cyclobutane-1,3-diisocyanate, cyclohexane-1,3- and 1,4-diisocyanate and mixtures of these isomers, as desired, isocyanate-3,3,5-trimethyl-5-isocyanate-methyl-cyclohexane and perhydro-2,4'- and/or -4,4'-diphenyl methane-diisocyanate.

Suitable modification products are, according to processes of prior art which are known per se, able to be produced from low-molecular weight polyisocyanates as mentioned above, by way of example, and have, for example, isocyanurate-, biuret-, allophanate-, carbodiimide- or uret dione-structural parts. Mixtures of the polyisocyanates mentioned can also be used as desired.

Constituent (a2) is any polysiloxane, which has at least 2 alcoholically bound hydroxyl groups. Polysiloxane diols of the general formula,

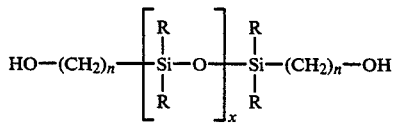

are particularly preferred, in which
R stands for an alkyl residue with 1 to 6 carbon atoms, preferably, a methyl group,
n stands for a whole number from 1 to 6, preferably 1, and
x stands for a whole number from 4 to 50, preferably 5 to 20.

The polysiloxanes which are suitable as constituent (a2) have the molecular weight mentioned above. Preferably, the molecular weight of the polysiloxanes is within the range of 400 to 1500. Mixtures of polysiloxanes of this nature can also be used as constituent (a2) as desired.

The production of the (a) prepolymers and/or semi-prepolymers is carried out by the reaction of constituents (a1) and (a2), which is known per se, keeping an NCO/OH equivalent ratio of 1.1:1 to 20:1, preferably 1.5:1 to 15:1 at 20° to 100° C., preferably 70° to 90° C. If readily volatile starting diisocyanates of the type mentioned above, by way of example, are used, the removal by distillation of the excess of monomeric starting diisocyanate which is still present following the reaction is often to be recommended when necessary. Subsequent treatment of this nature is, however, not generally necessary if modified starting polyisocyanates of the type mentioned above as an example are used.

In the impregnating agents according to the invention the NCO prepolymers and/or semi-prepolymers are present in solution in a suitable solvent, (b). The level of (a) prepolymers and/or semi-prepolymers contained in this solution is generally 5 to 50, preferably 7 to 30, and, in particular, 7 to 20% by weight. The solvents must clearly be inert with respect to isocyanate groups. Suitable solvents are, for example, toluene, xylene, ethyl acetate, butyl acetate, acetone, methyl-ethyl ketone, methyl isobutyl ketone, ethylene glycol monomethyl ether acetate, cyclohexane or any mixtures of solvents of this nature. The following are particularly suitable (for the purpose of guaranteeing miscibility with water): hydrophilic solvents, for example, mixtures of ketones of the type mentioned and, optionally, toluene. Orthosilicic acid alkyl esters can also be used advantageously as special solvents. Suitable orthosilicic acid esters, are, for example, silicic acid tetramethyl-ester or silicic acid tetraethyl ester. These special solvents have the double function of a solvent and a reactive thinner. The silicic acid esters obviously react under the effects of atmospheric moisture with the formation of polymeric, silicic acid with the result that, when these silicic acid esters are used in the process the hardening mechanism is based on this reaction and, at the same time, on the known cross-linking reaction of the NCO prepolymers and/or semi-prepolymers under the effects of atmospheric moisture.

The silicic acid esters can be used in a mixture with the solvents mentioned or as the only solvents. In the calculation of the amount of (a) prepolymers or semi-prepolymers contained in the impregnating agents the weight of the silicic acid esters which are optionally used as solvents goes into the weight of the solvent.

The (c) auxiliary agents and supplementary agents which are optionally present in the impregnating agents according to the invention are, for example, cyclic acid anhydrides such as maleic anhydride, phthalic anhydride or tetrahydrophthalic anhydride, which are often incorporated in the impregnating agents when the latter contain silicic acid esters of the kind just mentioned. These acid anhydrides have the effect of accelerating the reaction of the silicic acid esters with the formation of polymeric silicic acid.

Other (c) auxiliary agents and supplementary agents which can optionally be used are, for example, catalysts which accelerate the isocyanate water reaction. The following are very suitable, for example: the blocked amine- and tin catalysts according to DE-OS No. 3 326 566. These catalysts are added to the impregnating agents, if at all, in quantities of up to 8, preferably up to 5% by weight.

Other (c) auxiliary agents and supplementary agents which can optionally be used are, for example, stabilizers such as benzoyl chloride, surface-active substances or auxiliary flow improvers of the kind which is known per se from varnish technology. Pigments and fillers can also be used in the process, but this is less favoured.

The use of the impregnating agents according to the invention for the impregnation of mineral substrates, in particular, of concrete or natural stone, can take place according to the usual processes. Examples which can be mentioned here are the techniques of spraying, rolling, immersion or painting.

In the examples which follow all the percentage data relate to percentages by weight, unless otherwise stated, and all data given in "parts" refer to parts by weight. The term, "prepolymer", as used in the example part is also intended to include "semi-prepolymers".

EXAMPLES

1. The production of NCO-prepolymers 1.1 A prepolymer made of isophorone diisocyanate and an $\alpha,\omega$-alkylhydroxy functional polysiloxane with 6% OH 1400 parts of an $\alpha,\omega$-hydroxy methyl polydimethylsiloxane of the molecular weight, 560, corresponding to the above general formula are added, drop by drop, to 1102.5 parts of isophorone diisocyanate (37.84% NCO) which have been placed in the container beforehand, within one hour at 70° to 80° C. When the reaction has finished 2.63 parts of benzoyl chloride are also added. The isocyanate content is approximately 8%.

1.2 A prepolymer made of isophorone diisocyanate and an $\alpha,\omega$-alkyl hydroxy functional polysiloxane with 3% OH:

350 parts of an $\alpha,\omega$-hydroxy methyl polydimethylsiloxane of the molecular weight of 1135, corresponding to the general formula given above, are added, drop by drop, to 137.8 parts of isophorone diisocyanate (37.84% NCO) which have been placed in the container beforehand, at 70° to 80° C. When the reaction has finished 0.5 parts of benzoyl chloride are also added. The isocyanate content is approximately 7.4%.

1.3 A prepolymer made of isophorone diisocyanate, tris(isocyanate hexyl) biuret and an $\alpha,\omega$-alkyl hydroxy functional polysiloxane with 6% OH:

111 parts of isophorone diisocyanate (37.84% NCO) and 190.9 parts of tris(isocyanate hexyl) biruet (23% NCO) are placed in the container first, with stirring, and 300 parts of the polysiloxane according to example 1.1 are added, drop by drop, at a temperature of 70° to 80° C. When the reaction has finished 0.5 parts of benzoyl chloride are added. The isocyanate content is 6.1%.

2. The production of solutions of the prepolymers and their application.

2.1 The prepolymer produced according to 1.1 is dissolved, at a level of 10%, in a solvent mixture of toluene, methyl ethyl ketone and acetone, in the proportions 1:1:4.

2.2 1% dibutyltin dilaurate and, per mol of dibutyltin dilaurate, 4 mol of tosyl isocyanate are additionally added to a solution according to 2.1, as a catalyst.

2.3 A solvent mixture made of 50% of the mixture used in example 2.1, of toluene, methyl ethyl ketone and acetone in the proportions 1:1:4, and 50% tetraethoxy silane is produced and the prepolymer produced according to 1.1 is dissolved in it to form a 10% solution.

2.4 The prepolymer produced according to 1.1 is dissolved in tetraethoxy silane as a solvent to form a 10% solution.

2.5 1% dibutyltin dilaurate per mol of dibutyl stannic dilaurate and 4 mol tosyl isocyanate are additionally added, as a catalyst, to a solution according to 2.3.

2.6 The testing of the solution for its usefulness as a concrete impregnating agent was carried out by the application of the solutions by means of one-way spraying onto round test pieces made of concrete which had been ground level on the surface.

The penetration of the prepolymer solutions was tested by cutting up the test pieces and wetting the cut edges with water.

In solutions 2.1 and 2.2 it was possible to establish penetration depths of up to 5 mm; solutions 2.3, 2.4 and 2.5 reached penetration depths of up to 10 mm.

3. The checking of effectiveness against carbonization of concrete surfaces.

According to DIN 1164, test pieces which were $4 \times 4 \times 16$ cm large were produced from concrete of quality B 25 PZ 35 F. The concrete mixture used in this consisted of 78.1% quartz sand with a screen line according to DIN 1045, 14.6% portland cement PZ 35 F and 7.3% water. The test pieces obtained were stored for 28 days at 20° C. and 80% relative atmospheric moisture, and then dried by means of open storing at room temperature.

For the impregnation of the test pieces a solution of 15% of the prepolymer described in example 1.1 and 85% cyclohexane was produced. 3 test pieces were weighed, immersed in the impregnating solution for 10 minutes and then weighed again. The absorption of impregnating solution was 26 g/cm$^2$ concrete surface. After 60 minutes of open storing at room temperature the test pieces were immersed in the impregnating solution again for 10 minutes.

The absorption of impregnating solution was 15 g/m$^2$ concrete surface. The total absorption of impregnating solution was thus 41 g/m$^2$ concrete surface. The 3 impregnated test pieces were stored for 7 days at 23° C. and at 70% relative atmospheric moisture.

Subsequently the 3 impregnated test pieces and 1 test piece which had not been impregnated were stored for 4 weeks in an air atmosphere with 1 vol% CO$_2$ at 20° C. and 60% relative atmospheric moisture.

In order to verify the depth of penetration of CO$_2$ into the surface of the concrete and the consequent carbonization of the concrete the test pieces were broken through and the cross-section of the point of the break was sprayed with a pH indicator solution containing phenolphthalein.

The carbonized area remained colourless whereas the undamaged concrete was coloured red violet.

The 3 impregnated test pieces exhibited an average carbonization depth of 2.7 mm, whereas the average carbonization depth in the test piece which had not been impregnated was 4.5 mm.

What is claimed is:

1. An impregnating agent consisting essentially of
   (a) an NCO-prepolymer or NCO-semi-prepolymer which is curable by atmospheric moisture, with an NCO content of 2 to 25% by weight, based on
   (a1) an organic polyisocyanate and
   (a2) a compound with at least 2 alcohol hydroxyl groups,
   (b) a solvent which is inert with respect to isocyanate groups in which the (a1) organic polyisocyanate is a polyisocyanate with exclusively aliphatically or cycloaliphatically bound isocyanate groups and the (a2) polyhydroxyl compound is a polysiloxane of the molecular weight range of 300 to 5000 which has at least 2 alcoholically bound hydroxyl groups.

2. An impregnating agent according to claim 1, in which the (a2) component is a hydroxyl terminated polysiloxane of the following formula:

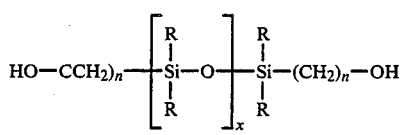

in which

R stands for an alkyl residue with 1 to 6 carbon atoms,
n stands for a whole number from 1 to 6 and
x stands for a whole number from 4 to 50.

3. An impregnating agent according to claim 1, which additionally contains auxiliary agents and supplementary agents.

4. An impregnating agent according to claim 2, in which R stands for a methyl group, n stands for 1 and x stands for a whole number from 5 to 20.

* * * * *